Jan. 21, 1964     N. L. CULL ETAL     3,118,948
PREPARATION OF HIGH MOLECULAR WEIGHT OXYGENATED COMPOUNDS
Filed July 23, 1957
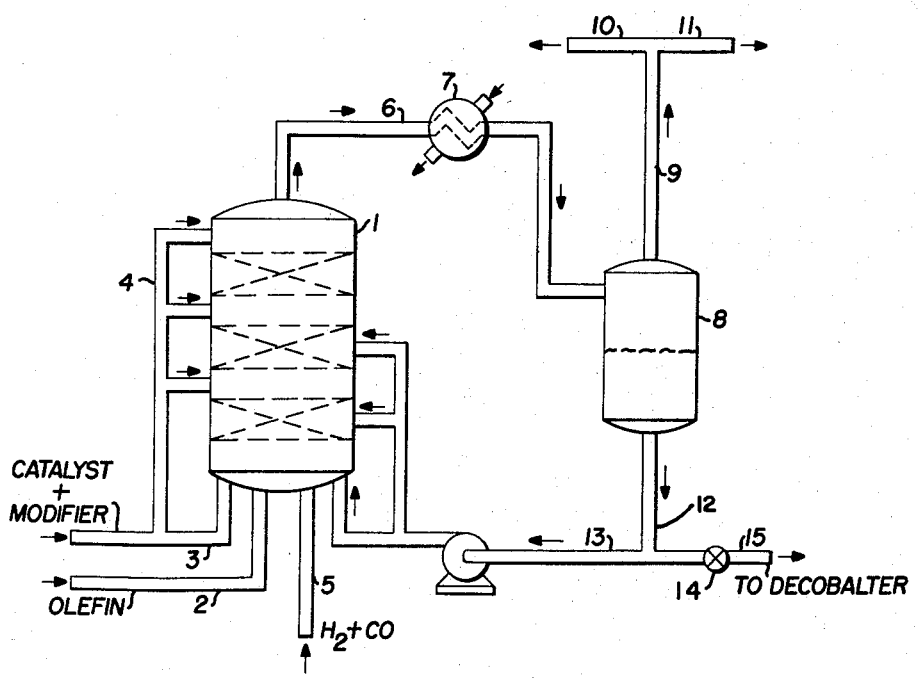
Neville Leverne Cull
Clyde Lee Aldridge     Inventors
By *Seymour Stahl* Attorney United States Patent Office 3,118,948
Patented Jan. 21, 1964

3,118,948
PREPARATION OF HIGH MOLECULAR WEIGHT
OXYGENATED COMPOUNDS
Neville Leverne Cull, Baker, and Clyde Lee Aldridge,
Baton Rouge, La., assignors to Esso Research and Engineering Company, a corporation of Delaware
Filed July 23, 1957, Ser. No. 673,701
2 Claims. (Cl. 260—604)

The present invention relates to the preperation of oxygenated organic compounds by the reaction of olefins with hydrogen and carbon monoxide in the presence of a carbonylation catalyst. More specifically, the present invention relates to a novel process for producing high molecular weight alcohols containing two more carbon atoms than twice the number in the olefin feed.

It is well known in the art that oxygenated organic compounds may be synthesized from organic compounds containing olefinic linkages by a reaction with carbon monoxide and hydrogen in the presence of catalyst containing metals of the iron group in a two-stage process in which predominantly aldehydes and minor proportions of ketones and alcohols are formed in a first step in the presence of a carbonylation catalyst comprising metals of the iron group and particularly cobalt, and the products from the first step may then be hydrogenated in a second step to convert the organic carbonyl compounds containing one more carbon atom than the olefinic starting material to the corresponding alcohol. Likewise, if desired, the aldehydes may be converted to the corresponding fatty acids by oxidation. The second stage hydrogenation catalyst may comprise any known reduction catalyst such as metallic supported or unsupported nickel, copper chromite, sulfactive catalysts such as oxides and sulfides of tungsten, nickel and molybdenum and the like.

The carbonylation or Oxo reaction by which name this process is generally known, provides a particularly attractive method of preparing primary alcohols to supply the large market for plasticizers, detergents, solvents and the like. Amenable to the reaction to a greater or less degree are long and short chained olefinic compounds, not only hydrocarbons but most other organic compounds having a carbon-to-carbon olefinic linkage such as unsaturated alcohols, acids, esters and the like. Straight and branch-chained olefins such as propylene, butene, pentene, hexene, heptene, styrene, olefin polymers such as di- and tri-isobutylene, hexene and heptene dimers, polypropylenes, olefinic fractions from the hydrocarbon synthesis process, thermal or catalytic cracking operations and other sources of hydrocarbon fractions containing such olefins may be used as starting materials depending on the nature of the final product desired. The synthesis gas mixture fed to the first stage may be any desired ratio of $H_2$ to CO, preferably within the limits of 0.5 to 5 volumes hydrogen peer volume of carbon monoxide. The conditions for reacting olefins with the synthesis gases vary somewhat in accordance with the nature of the olefin feed, the reaction being generally conducted at pressures in the range of from about 1500 to 4500 p.s.i.g. and the ratio of synthesis gas to olefin may vary widely; in general, about 2500 to 25,000 cubic feet of $H_2+CO$ per barrel of olefin feed are employed.

The catalyst for the first stage of the process is preferably employed in the form of an oil-soluble compound of the catalytically active carbonylation metal. Thus there have been employed the salts of the metals such as cobalt and high molecular weight fatty acids such as stearic, oleic, naphthenic, linoleic and the like. Water soluble catalysts, such as cobalt acetate, chloride, and the like, have also been successfully employed. Catalyst concentrations may vary from about 0.05 to 5.0% by weight of the catalyst salt calculated as cobalt based on the olefinic feed. The first stage or carbonylation reaction is generally carried out at temperatures in the range of from about 250° to 450° F. depending upon the nature of the olefin and other reaction conditions. In general, the lower olefins will react at lower temperatures and react to a greater extent than the high molecular weight olefins. The carbonylation reaction is an exothermic one, with a heat release of the same high order or magnitude as in the hydrocarbon synthesis process, about 35 to 50 Kcal./gram-mol olefinic double bond reacted and, therefore, careful temperature control is required in the reaction zone to prevent decomposition of cobalt carbonyl to metallic cobalt and also to prevent formation of secondary reaction products and undesired reactions, such as hydrogenation of the olefin, formation of hydrocarbon synthesis product, and the like.

Versatile as this alcohol synthesis, or "Oxo" reaction is in the production of alcohols from olefins, the process in the past has not proved itself adaptable to the preparation in good yields of high molecular weight alcohols. These compounds are of particular importance commercially in the manufacture of detergents and a multitude of other purposes. It has been found that, as the molecular weight of the olefin increases, the conversion to the aldehyde falls off rapidly and, with olefins above about 12 carbon atoms, reaction rates are too slow and yields too low for a commercially feasible operation. This rate and yield decrease with increasing molecular weight of olefin is particularly evident in the case of highly branched olefins, such as those prepared by polymerizing low molecular weight olefins, i.e., the polymers and copolymers of propylene, butylenes and amylenes.

It is, therefore, a purpose of the present invention to disclose a novel process of producing substantial yields of high molecular weight primary alcohols by the carbonylation reaction.

It is a further purpose of the present invention to produce these high molecular weight dimer alcohols from olefins having a substantially lower molecular weight, which olefins are in considerably larger supply than high molecular weight olefins, without a decrease in total alcohol yield.

Other and further purposes and objects of the present invention will become more apparent hereinafter.

It has hitherto been found that accompanying the main carbonylation reaction, i.e., the reaction wherein an olefin is converted to an aldehyde having one more carbon atom, there is formed a large number of secondary reaction products, such as esters, aldols, polymers, ketones and the like. It has now been found that by addition of the reaction modifier of this invention there is formed, in good yields, a primary alcohol product having $2n+2$ carbon atoms, where an olefin with $n$ carbon atoms is passed to the carbonylation zone. Accompanying this reaction is the normal aldehyde synthesis reaction producing aldehydes and alcohols having $n+1$ carbon atoms. Other secondary reaction products are substantially absent; the normal reaction product also is formed to a substantially smaller extent than in the absence of the reaction modifier.

In accordance with the present invention, the high molecular weight alcohols which will be referred to herein as dimer alcohols may thus be produced from low molecular weight olefins by the carbonylation reaction, followed by hydrogenation, when the carbonylation stage is conducted in the presence of certain oil-soluble compounds of the metals in group IV of the periodic chart. The additives employable are the oil-soluble compounds or complexes of titanium, zirconium, hafnium, thorium, and lead. The more common oil-soluble compounds are typified by the above metal salts of high molecular weight acids, e.g., oleic, stearic, naphthenic, linoleic, the complexes with di-ketones such as acetylacetone, alcoholates of the fatty alcohols such as decyl, tridecyl, etc., and other organic radicals which will provide an oil-soluble compound. Also to be included are the oil-soluble organic esters of the aforesaid group IV metal acids, e.g., tetra alkyl titanate. Oil-soluble group IV metal complexes such as a complex of the metal with cobalt hydrocarbonyl and the like are also useful.

The process itself is conventional save for the use of the modifiers mentioned above. These modifiers may be added in either solution or as solids from a pressurized hopper. The manner in which the reaction modifiers are added is not critical. Preferably, however, these will be added to the olefin feed or solvent therefor although they may be injected into the reactor separately at different points.

In accordance with one embodiment of the present invention, there is passed into the first stage reaction zone along with the olefin, carbon monoxide, hydrogen and cobalt carbonylation catalyst, the oil-soluble group IV metal-containing reaction modifier of the type noted above. Cobalt may be added in any form, for it is reasonably sure that the active catalytic agent is the hydrocarbonyl which is synthesized in the course of the reaction and which is soluble in the olefin-aldehyde mixture.

The present invention will best be understood from the more detailed description hereinafter, wherein reference will be made to the accompanying drawing which is a schematic illustration of a system suitable for carrying out a preferred embodiment of the invention.

Referring now to the drawing, an olefinic hydrocarbon is fed through feed line 2 to the bottom of primary reactor 1. The latter comprises a reaction vessel preferably divided into discrete zones separated by trays and free space. The reactor is preferably packed with inert solids to facilitate gas-liquid contact.

Also passed into reactor 1 are cobalt carbonylation catalyst and the group IV metal reaction modifier. In a preferred modification, a mixture of cobalt and reaction modifier is employed dissolved in the olefin feed and is admitted through line 2. It is to be understood that other forms of cobalt, such as an aqueous solution of a cobalt salt, i.e., cobalt acetate, or a slurry of oil-insoluble cobalt solids, such as cobalt oxide, metal, carbonate and the like, may be employed. Cobalt is generally added preferably to the extent of 0.1% to 0.5% calculated as metal on olefin feed, while the group IV metal compound is added to the extent of .01 to 0.2 mole/liter, preferably .01 to .05 moles/liter cauculated as metal based on olefin feed.

Simultaneously, a gas mixture containing $H_2$ and CO in the approximate ratio of 0.5 to 2 volumes $H_2$ per mole CO is supplied through line 5 and flows concurrently with the olefinic and aldehyde product upwardly through reactor 1. The latter is preferably operated at pressures of about 2500–3500 p.s.i.g. and temperatures of 200 to 400° F.

Liquid oxygenated reaction products comprising aldehydes are withdrawn from the upper portion of reactor 1 through line 6. The product, which is at a temperature of about 300 to 375° F., is then passed to cooler 7, where the temperature is lowered to about 60 to 120° F., and then passed to high pressure gas-liquid separator 8. Herein separation of unreacted gases from liquid product occurs. The unreacted gasses may be withdrawn through line 9, and after scrubbing, may be recycled to the system via line 10, or in part purged. Liquid aldehyde product containing high concentration of cobalt carbonyl is withdrawn from high pressure separator 8 through line 12. A portion of this stream is preferably passed via line 13 to aldehyde synthesis reactor 1 to supply both cooling and a portion of the catalyst requirements of that vessel; the amount of product recycled being a function of the amount of cooling required in the reactor. The recycled liquid is preferably added along the length of reactor 1. Other means for cooling may be employed if desired.

Liquid aldehyde product not recycled to reactor 1 is passed through pressure release valve 14 and line 15. This material, containing dissolved cobalt carbonyl and group IV metal compound is sent to a catalyst decomposition or decobalting zone, where in the presence of heat and steam, water, or dilute organic acid, the metal contaminants may be removed from the aldehyde product. The metal compounds may be decomposed by direct or indirect heating, e.g., steam, etc., or be made insoluble in the organic mixture by treatment with a low molecular weight organic acid such as acetic, oxalic, etc. Various demetalizing techniques are known and in this invention any one may be employed.

The aldehyde product, substantially completely free of inorganic compounds, is then hydrogenated under conventional conditions to alcohols and the alcohol product fractionated to produce both the $n+1$ and the $2n+2$ alcohols, as described.

The process of the present invention may be further illustrated by the following specific examples.

*Example 1*

One liter of UOP $C_7$ olefin was oxonated with a residence time of six hours at 350° F. and 3000 p.s.i.g. of 1.1/1. $H_2$/CO gas pressure. The catalyst consisted of .033 mole of cobalt as the oleate, modified by .022 mole of thorium as the acetylacetonate. The reaction mixture was thermally demetallized by heating for 2 hours at 350° F. under 500–1000 p.s.i.g. hydrogen pressure. The product was hydrogentaed with 12 volume percent of reduced nickel catalyst for 6 hours at 350° F. under 3000 p.s.i.g. pressure of methanized hydrogen.

The product was distilled at 20 mm. pressure after removal of the hydrocarbon at atmospheric pressure. Distillation was carried out in a 1 inch 30 plate Oldershaw column at 5/1 reflux ratio. The product distribution is given below.

| Component | B.R., ° F. @ 20 mm. Press. | Weight Percent |
|---|---|---|
| Hydrocarbon | Initial-[1] 265 | 18.2 |
| $C_8$ Alcohol | [1] 265–225 | 50.0 |
| Intermediate | 225–330 | 9.3 |
| $C_{16}$ Alcohol | 330–360 | 6.0 |
| Bottoms | 360+ | 10.4 |

[1] Atmospheric pressure temperature.

*Example 2*

A run was made similar to Example 1 except that .022 mole of titanium as the tetrabutyl titanate was used as a catalyst modifier. Product distribution is shown below.

| Component | B.R., ° F. @ 20 mm. Press. | Weight Percent |
|---|---|---|
| Hydrocarbon | Initial-[1] 265 | 16.4 |
| $C_8$ Alcohol | [1] 265–225 | 62.1 |
| Intermediate | 225–330 | 4.8 |
| $C_{16}$ Alcohol | 330–360 | 6.3 |
| Bottoms | 360+ | 8.5 |

[1] Atmospheric pressure temperature.

Noteworthy in this run are the higher yields of $C_8$ alcohol and lower yields of intermediate.

Example 3

This run was similar to the preceding example except that .022 mole of titanium as the titanium stearate was used. Product distributions are given below.

| Component | B.R., °F. @ 20 mm. Press. | Weight Percent |
|---|---|---|
| Hydrocarbon | Initial-¹ 265 | 18.3 |
| $C_8$ Alcohol | ¹ 265–225 | 59.4 |
| Intermediate | 225–330 | 4.8 |
| $C_{16}$ Alcohol | 330–360 | 7.0 |
| Bottoms | 360+ | 9.4 |

¹ Atmospheric pressure temperature.

Example 4

Triplicate runs similar to Example 1 were made except that no metal modifier was used. The product consisted of the following:

| Component | B.R., °F. @ 20 mm. Press. | Weight Percent | | |
|---|---|---|---|---|
| Hydrocarbon | Initial-¹ 265 | 18.0 | 22.5 | 20.0 |
| $C_8$ Alcohol | ¹ 265–225 | 62.0 | 64.0 | 65.5 |
| Intermediate | 225–330 | 6.0 | 5.5 | 4.0 |
| $C_{16}$ Alcohol | 330–360 | 2.0 | 2.5 | 2.0 |
| Bottoms | 360+ | 12.0 | 5.5 | 8.5 |

¹ Atmospheric pressure temperature.

These data show the directional effect in the production of $C_{16}$ alcohol from $C_7$ olefins when the oil-soluble group IV metal compounds of this invention are employed. It will be noted that little dimer alcohol yield is obtained in the absence of the modifier under identical conditions. The above tests employ metals which are classified in group IV–B of the Periodic chart (Lange's Handbook of Chemistry, 5th ed., published by Handbook Publishers, Inc., pp. 54–55). The only operable metal in group IV–A is lead. The following example illustrates the effectiveness of oil-soluble lead compounds for the instant purpose.

Example 5

700 g. of UOP $C_7$ olefin was oxonated at 350° F. and 3000 p.s.i.g. pressure for 6 hours. The catalyst consisted of 0.033 mole of cobalt oleate and 0.022 mole of Pb-stearate)$_2$. The product was decobalted 2 hours at 350° F. under a pressure of 700 p.s.i.g. of hydrogen and then hydrogenated 6 hours at 350° F. and 3000 p.s.i.g. of $H_2$ over 120 cc. of reduced nickel catalyst.

The distribution of the product on distillation in a 30-plate column is compared below with blank Oxo runs under the same conditions.

| Component | Blanks | Lead Run |
|---|---|---|
| Hydrocarbon, B.P., initial-345° F. atm | 22.5 / 18 | 34.6 |
| $C_8$ Alcohol, initial-210° F., 20 mm | 64 / 62 | 40.1 |
| Intermediate, 210° F.-330° F., 20 mm | 5.5 / 6.0 | 3.3 |
| $C_{16}$ Alcohol, 330°-360° F., 20 mm | 2.5 / 2.0 | 14.8 |
| Bottoms | 5.5 / 12.0 | 7.2 |

It will be noted that the lead apparently shows some inhibitory effect on conversion. This is not serious since this can be overcome by the use of slightly higher cobalt concentration. A slight increase in cobalt concentration will increase the conversion, and the dimeric alcohol yield will be about 20%.

Though the invention has shown at length the conversion of heptenes to $C_{16}$ alcohols, the invention is not restricted thereto. With higher-boiling olefins corresponding higher-boiling alcohols are produced, thus affording, for example, economical preparation of $C_{12}$ to $C_{24}$ alcohols.

Dimer alcohols also may be produced by thermally soaking the crude aldehyde product in the presence of the modifiers noted above. Typical conditions which may be employed for the thermal soaking are 0.05–5 wt. percent of modifier for 2–48 hours at 200°–450° F. and at atmospheric conditions to 1000 p.s.i.g. Preferably, the modifier employed should be soluble in the oxygenated product. The most outstanding results are achieved by contacting or thermally soaking the aldehyde product in the presence of the aforesaid modifiers prior to the decobalting operation. There is apparently some co-action between the cobalt catalyst and the modifier which effects good yields of the desired dimer product. The following is an example of the thermal soaking technique.

Example 6

One liter of $C_7$ UOP olefin is oxonated for 6 hours at 350° F. and 3000 p.s.i.g. with $H_2/CO$ gas pressure ratio of 1:1. The cobalt-containing catalyst comprises 0.033 mole of cobalt oleate. The reaction product is then passed to a thermal soaking drum wherein a 0.5 wt. percent of lead stearate calculated as lead on the oxygenated product is added and the mixture maintained at 350° F. for 6 hours. The resulting product will contain substantial amounts of dimer aldehyde. Decobalting and hydrogenation is carried out as noted in Example 1 to produce the $C_{16}$ alcohol. Advantageously, if the thermal soaking is carried out prior to decobalting, the cobalt and metal modifier may be removed in a single step.

What is claimed is:
1. The process for converting an olefinic compound having $n$ carbon atoms in the molecule into oxygenated compounds having $2n+2$ carbon atoms which comprises passing said olefinic compound, hydrogen, carbon monoxide, a cobalt carbonylation catalyst and an oil soluble titanium-containing reaction modifier, into a carbonylation zone, said modifier being employed in an amount sufficient to substantially increase the yield of said oxygenated compounds, maintaining elevated temperatures and pressures in said zone and recovering a mixture of oxygenated compounds containing aldehydes having $2n+2$ carbon atoms per molecule.

2. The process for converting an olefinic compound having $n$ carbon atoms in the molecule into oxygenated compounds having $2n+2$ carbon atoms which comprises passing said olefinic compound, hydrogen, carbon monoxide, a cobalt carbonylation catalyst and an oil soluble titanium-containing reaction modifier, into a carbonylation zone, said modifier being employed in an amount sufficient to substantially increase the yield of said oxygenated compounds, maintaining elevated temperatures and pressures in said zone and recovering a mixture of oxygenated compounds containing aldehydes having $2n+2$ carbon atoms per molecule.

References Cited in the file of this patent

UNITED STATES PATENTS

| | | |
|---|---|---|
| 2,509,878 | Owen | May 30, 1950 |
| 2,810,762 | Ernst et al. | Oct. 22, 1957 |
| 2,811,567 | Mason | Oct. 29, 1957 |
| 2,820,067 | Mertzweiller et al. | Jan. 14, 1958 |
| 2,830,089 | Fitzwilliam et al. | Apr. 8, 1958 |
| 2,949,486 | Weesner et al. | Aug. 16, 1960 |

OTHER REFERENCES

Wender et al.: Report of Investigations of 4270 Bur. of Mines, Dept. of Interior, June 1948; pages 8–11.

Oxo Process, patent applications of the I. G. Farbenindustrie Aktiengesellschaft Ruhrchemie Aktiengesellschaft and Ammoniak Laboratorium (1949), pages 12 and 13.